H. WIRZ.
COLLAPSIBLE DEMOUNTABLE TIRE RIM.
APPLICATION FILED OCT. 12, 1914.
1,163,055.  Patented Dec. 7, 1915.
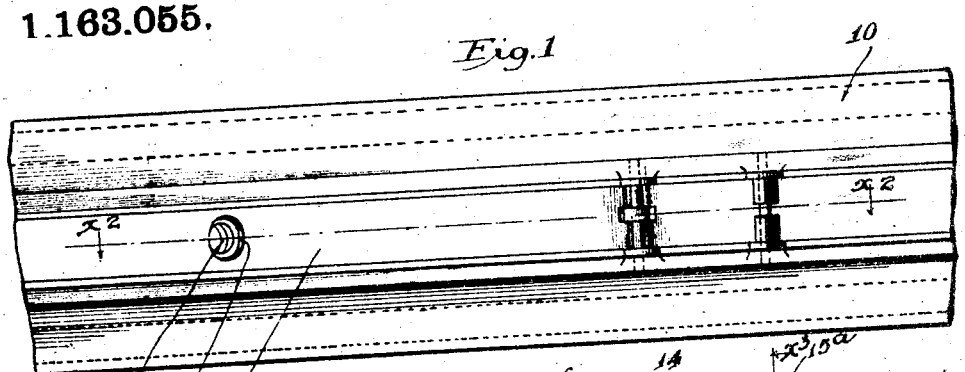
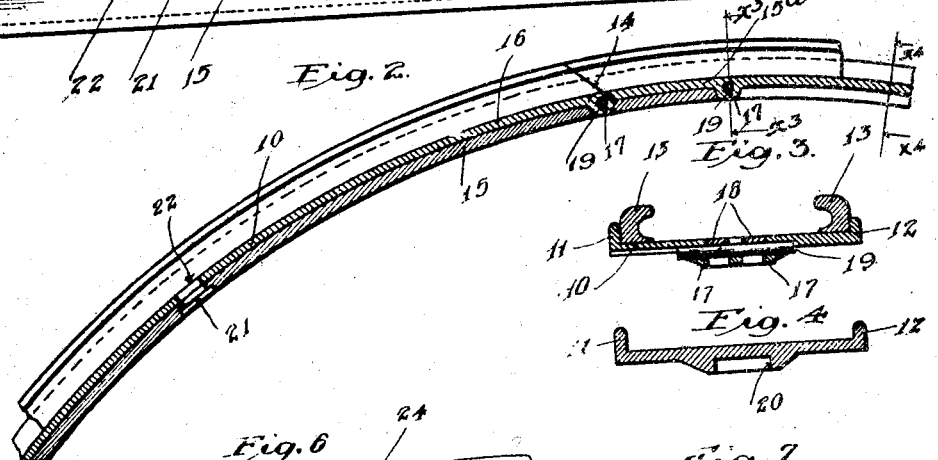
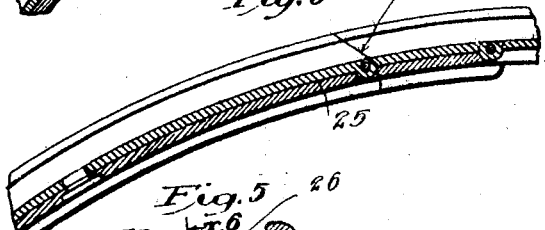
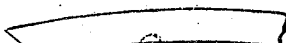
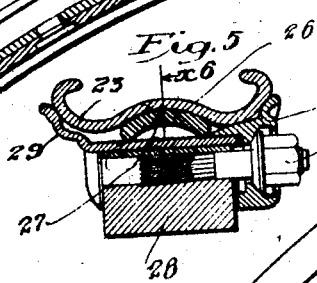
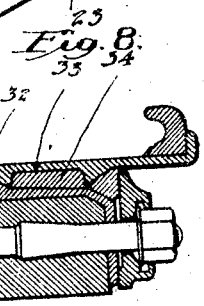
Witnesses:
Inventor
Henry Wirz

UNITED STATES PATENT OFFICE.

HENRY WIRZ, OF LOS ANGELES, CALIFORNIA.

COLLAPSIBLE DEMOUNTABLE TIRE-RIM.

1,163,055.  Specification of Letters Patent.  Patented Dec. 7, 1915.

Application filed October 12, 1914. Serial No. 866,211.

*To all whom it may concern:*

Be it known that I, HENRY WIRZ, a citizen of the United States, residing at Los Angeles, in the county of Los Angeles and State of California, have invented a new and useful Collapsible Demountable Tire-Rim, of which the following is a specification.

One of the objects of this invention is to provide a novel, practical and extremely simple means for securing the ends of a transversely split demountable rim of any construction whatsoever.

Another and more specific object of the invention is to provide in connection with a transversely split demountable rim, a lever pivotally secured to said rim adjacent the split portion thereof and adapted to collapse the rim when the latter is disconnected from the felly band so that a tire may be easily mounted and removed.

With these and other objects in view, the invention consists in certain novel features of construction, combination and arrangement of parts as will be hereinafter fully described, illustrated and claimed.

Referring to the drawings: Figure 1 is a fragmentary inside view of a tire rim constructed in accordance with my invention. Fig. 2 is a section taken on the plane of line $x^2$—$x^2$ of Fig. 1. Fig 3 is a transverse section taken on the plane of line $x^3$—$x^3$ of Fig. 1. Fig. 4 is a section on the plane of line $x^4$—$x^4$ of Fig. 2. Fig 5 is a transverse sectional view showing the adaptation of my invention to a demountable rim. Fig. 6 is a fragmentary sectional view taken on the plane of line $x^6$—$x^6$ of Fig. 5. Fig. 7 is a fragmentary side elevation showing the rim in its collapsed position. Fig. 8 is a transverse sectional view showing my invention as applied to a demountable rim.

Referring in detail to the drawings by numerals, 10 designates a demountable-transversely split rim having outwardly extending peripheral flanges 11 and 12, the outside flange 12 being of a less width than the inner flange 11 for a purpose to be hereinafter explained. The rim, when in operative position, is surrounded by the usual tire side rings 13 of any commercial design.

In carrying out my invention, the rim is cut transversely at a 45 degree angle, as indicated by the numeral 14, this particular angle being used so that the ends of the rim will properly abut when the rim is in service. To lock the ends of the rim together and to separate said ends to collapse the rim when it is desired to remove or mount a tire, I provide a lever 15 curved to conform to the inner circumference of the rim when in service. One extremity of the lever is pivotally connected to the rim portion 15ª in spaced relation to the end thereof, as best shown in Figs. 1 and 2, and the terminal of the other rim portion 16 is pivotally or hingedly connected to the lever at a point intermediate of the ends of the lever so that when the lever is swung into contact with the inner side of the rim, the ends of said rim will be brought squarely together. I preferably form the hinged or pivot connections between the lever 15 and the rim 10 by providing the rim with apertured ears or lugs 17 and offsetting portions of the lever to form crossover strips 18. Hinge pins 19, as shown in Fig. 3, extend through the apertured ear 17 and between the crossover pieces 18 and main portion of the lever. The rim 10 may be mounted on a wheel in the usual manner and is provided with an inner circumferential recess 20, in which the lever 15 lies when the rim is in use. The lever is provided with a valve stem opening 21 which is adapted to register with a similar opening 22 in the rim 12. The opening 21 is countersunk as shown to receive the nut on the valve stem thus locking the lever to the rim.

When it is desired to move a tire from a rim in use, said rim is first detached from the wheel and then the free end of the lever is grasped and swung inwardly to separate the ends of the rim and collapse said rim sufficiently to allow the outer side ring 13 to pass over the flange 12. The tire may then be slipped outwardly over the flange 12. The flange 11 is preferably made of such external diameter that the inner ring 13 will not clear it even when the rim is collapsed. This construction make it much easier to mount a tire, as it prevents the inner ring dropping off, when a tire is being placed on the collapsed rim.

In Figs. 5 and 6 I have illustrated in section a demountable-one-piece clencher rim slightly modified to meet the requirements of my invention. The demountable clencher rim 23 is transversely cut in a manner similar to the rim 10, as indicated by the numeral 24, and the ends of the split rim are joined by a lever 25 similar in every respect to the lever 15, with the exception that its outer face is rounded, as indicated at 26 to fit snugly a circumferential recess 27 formed in the rim 23. The rim is mounted on the felly 28 in the usual fashion by means of a felly band 29 and clamping wedge lug 30, which latter is held in position by a bolt and nut fastener 31. The commercial types of demountable one piece rims for clencher and straight-side type of tire now in use are not formed with the recess 27, and I find this recess necessary in order that the lever 25 may be made of sufficient thickness to give the required strength.

In Fig. 7, I have shown the lever 25 thrown inwardly to space the ends of the rim 23 and collapse the rim.

In Fig. 8, a cross section through a demountable-rim of a commercial construction now in use is shown to emphasize the fact that my construction of demountable-collapsible tire rim may be employed with various rims now on the market without any great modification thereof. The rim 32 of Fig. 8 is provided with a recess 33 which accommodates the lever 34, the latter being similar to the levers 15 and 25 previously described.

From the foregoing description taken in connection with the accompanying drawings, it is apparent that I have provided a demountable-collapsible rim, which is capable of many functions, and which is very practical, cheap of construction and substantial.

While I have shown and described the preferred embodiment of my invention, it will be understood that changes of construction and arrangement of parts, such as fall within the scope of the claims, may be made without departing from the spirit of the invention.

What I claim is:

1. The combination with a transversely cut rim, having an inside flange and an outside flange of less width than the inside flange, clamping rings surrounding the rim and engaging said flanges, and means for decreasing the diameter of said rim a certain fixed amount whereby the said rings may be placed over the smaller of said flanges.

2. The combination with a transversely split tire rim having a valve-stem receiving opening therein, of means for decreasing the diameter of the rim, including a lever connected with the rim and having an opening therein registering with the opening in the rim.

3. The combination with a transversely split tire rim having an inside flange and an outside flange extending outwardly from the rim a distance less than the inside flange, clamping rings surrounding the rim and engaging the flanges, and means for decreasing the diameter of the rim a certain fixed amount, whereby the rings may be placed over the smaller of the flanges, said means including a lever having an opening therein, said rim having a tire-valve-stem receiving opening therein adapted to register with the opening in the lever.

In testimony whereof I have hereunto set my hand at Los Angeles, California, this 1st day of October 1914.

HENRY WIRZ.

In presence of—
 RODNEY M. SMITH,
 LORRAINE E. DURROW.